United States Patent
Kuroda et al.

(10) Patent No.: US 7,347,093 B2
(45) Date of Patent: Mar. 25, 2008

(54) ANGULAR VELOCITY SENSOR AND AUTOMOBILE USING THE SAME

(75) Inventors: Keisuke Kuroda, Osaka (JP); Takeshi Uemura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/541,320

(22) PCT Filed: Feb. 3, 2005

(86) PCT No.: PCT/JP2005/001576

§ 371 (c)(1),
(2), (4) Date: Jul. 11, 2006

(87) PCT Pub. No.: WO2005/078388

PCT Pub. Date: Aug. 25, 2005

(65) Prior Publication Data

US 2006/0277996 A1 Dec. 14, 2006

(30) Foreign Application Priority Data

Feb. 16, 2004 (JP) .............................. 2004-038218

(51) Int. Cl.
*G01P 19/56* (2006.01)
(52) U.S. Cl. .................. 73/504.12; 73/504.16
(58) Field of Classification Search ............. 73/504.04, 73/504.02, 504.12, 504.16, 504.15, 1.37, 73/1.38

See application file for complete search history.

(56) References Cited

U.S. PATENT DOCUMENTS 6,076,402 A * 6/2000 Oh et al. .................. 73/504.12
6,220,094 B1 * 4/2001 Ichinose et al. ......... 73/504.16
6,412,347 B1 * 7/2002 Kuroda et al. ........... 73/504.16
6,792,792 B2 * 9/2004 Babala ....................... 73/1.38
7,107,843 B2 * 9/2006 Ohuchi et al. ........... 73/504.16

FOREIGN PATENT DOCUMENTS

| JP | 04-295716 | 10/1992 |
|---|---|---|
| JP | 05-037267 | 2/1993 |
| JP | 07-022880 | 1/1995 |
| JP | 08-154036 | 6/1996 |
| JP | 09-281138 | 10/1997 |
| JP | 2001-056224 | 2/2001 |
| WO | WO 03/043187 A1 | 5/2003 |

\* cited by examiner

*Primary Examiner*—Helen Kwok
(74) *Attorney, Agent, or Firm*—McDermott Will & Emery LLP

(57) ABSTRACT

The invention provides an angular velocity sensor which is provided with a smoothing circuit having a large smoothing time constant so that it can be reduced in size and integrated into an IC. Smoothing circuit (9) is provided with first switch (11), first capacitor (12), second switch (13), second capacitor (17) and control signal feeding module (15). Control signal feeding module (15) feeds first switch (11) and second switch (13) with a signal for controlling ON/OFF. According to this configuration, an equivalently large smoothing time constant can be set by reducing the frequency of the switching control signal of control signal feeding module (15), even if the capacities of first capacitor (12) and second capacitor (17) are small. Especially in case the capacitors are integrated into an IC, their area of occupation can be reduced to reduce the size of the angular velocity sensor and integrate the same into the IC.

8 Claims, 9 Drawing Sheets

ANGULAR VELOCITY SENSOR AND AUTOMOBILE USING THE SAME

TECHNICAL FIELD

The present invention relates to an angular velocity sensor and an automobile using the sensor.

BACKGROUND ART

One example of the angular velocity sensor of this kind is shown in FIG. 11. In FIG. 11, oscillating element 4 is provided with drive electrode 1, monitor electrode 2 and detecting electrode 3.

The output side of drive circuit 5, the input side of detecting circuit 6 and the input side of monitor circuit 7 are connected with drive electrode 1, detecting electrode 3 and monitor electrode 2, respectively.

The output side of monitor circuit 7 is connected with the input side of rectifying circuit 8, which outputs a signal rectified from a signal inputted from monitor circuit 7. The output side of rectifying circuit 8 is connected with the input side of smoothing circuit 9, which outputs a smoothed signal smoothed from the signal inputted from rectifying circuit 8. The output side of monitor circuit 7 is also connected with the input side of oscillation control circuit 10, the output side of which is connected with the input side of drive circuit 5. The output signal of smoothing circuit 9 is inputted as a gain control signal to oscillation control circuit 10.

Smoothing circuit 9 is provided with first resistor 16, second capacitor 17 and first reference voltage 14. The output side of rectifying circuit 8 is connected with one terminal of first resistor 16, the other terminal of which is connected with one terminal of second capacitor 17 and the input side of the gain control signal of oscillation control circuit 10. First reference voltage 14 is connected with the other terminal of second capacitor 17.

The output signal of rectifying circuit 8 is smoothed on the basis of smoothing time constant τ1, as expressed by (Equation 1), if first resistor 16 has resistance R1 and if second capacitor 17 has capacity C2:

$$\tau 1 = R1 \cdot C2 \quad \text{(Equation 1).}$$

The smoothed output signal is inputted as the gain control signal to oscillation control circuit 10. This oscillation control circuit 10 controls the smoothed output signal into a gain according to the level of the gain control signal, i.e., the amplitude level of oscillating element 4, as generated by monitor electrode 2, and feeds an output signal to drive circuit 5.

Gain Av of oscillation control circuit 10 is expressed by (Equation 2), if the reference voltage of oscillation control circuit 10 is designated by Vref, if the gain control signal or the output signal of smoothing circuit 9 is designated by Vc and if the amplification factor of oscillation control circuit 10 is designated by A:

$$Av = A \cdot (Vref - Vc) \quad \text{(Equation 2).}$$

In case the transmission impedance of oscillating element 4 is increased by disturbing conditions such as a temperature change, the drive amplitude of oscillating element 4 decreases with respect to the drive signal fed from drive circuit 5 to drive electrode 1. As a result, all of the charge to be generated in monitor electrode 2 in accordance with the oscillation level of oscillating element 4, the output voltage of monitor circuit 7 and the output signal of rectifying circuit 8 decrease so that gain control signal Vc or the output signal of smoothing circuit 9 decreases. On the basis of (Equation 2), gain Av of oscillation control circuit 10 increases, and all the output signal of oscillation control circuit 10, the output signal of drive circuit 5 and the voltage to be applied to drive electrode 1 increase, so that the drive amplitude of oscillating element 4 increases. As a result, oscillating element 4 is controlled to an initial amplitude level so that a stable sensor output can be achieved even under the disturbing conditions such as the temperature change.

The prior art relating to the invention of this application is disclosed, for example, in JP-A-9-281138.

In this configuration of the prior art, however, a resistor and a capacitor with large constants have to be prepared for the smoothing circuit. Especially when the smoothing circuit is configured of an IC (Integrated Circuit), the area for the resistor and the capacitor to occupy is enlarged to harm the size reduction and the circuit integration of the sensor.

SUMMARY OF THE INVENTION

In view of the aforementioned problems of the prior art, the invention contemplates to provide an angular velocity sensor, which is provided with a smoothing circuit having a large smoothing time constant, and to reduce the size of the sensor and integrate the sensor into an IC.

In the angular velocity sensor of the invention, a smoothing circuit includes: a first switch having an input terminal connected with the output side of a rectifying circuit; a first capacitor having its one terminal connected with the output terminal of a first switch; and a second switch having an input terminal connected with the output terminal of the first switch and an output terminal connected with the input side of an oscillation control circuit. Further included are: a first reference voltage connected with the other terminal of the first capacitor; a second capacitor having its one terminal connected with the output terminal of the second switch and its other terminal connected with the first reference voltage; and control signal feeding means for controlling the ON/OFF of the first switch and the second switch.

With this configuration, an equivalently large smoothing time constant can be set by reducing frequency fclk of the switching control signal of the control signal feeding means, even if the first capacitor and the second capacitor have small capacities. Especially in case the capacitors are integrated into the IC, their area of occupation can be reduced.

The angular velocity sensor of the invention is configured such that the control signal feeding means is fed as its source signal with the output signal of the monitor circuit. As a result, no new control signal generating source need be provided so that the size reduction of the sensor can be realized. With this simple circuit configuration, moreover, the control signal can be generated to feed a stable control signal to the control signal feeding means.

The angular velocity sensor of the invention is also configured such that the control signal feeding means is fed as its source signal with the output signal of the drive circuit. As a result, no new control signal source need be provided so that the stable control signal can be fed to the control signal feeding means.

The angular velocity sensor of the invention is also configured such that the control signal feeding means is fed as its source signal with the output signal of the oscillation control circuit.

As a result, the stable control signal can be fed to the control signal feeding means without providing any new control signal source.

The angular velocity sensor of the invention is also configured such that the control signal feeding means is fed as its source signal with the output signal of an oscillating circuit. As a result, the stable control signal can be fed to the control signal feeding means independently of the drive frequency of the oscillating element.

The angular velocity sensor of the invention is also configured such that the control signal feeding means is fed as its source signal with an AC signal applied from signal generating means outside of the sensor. As a result, the stable control signal can be fed to the control signal feeding means independently of the drive frequency of the oscillating element.

Moreover, an automobile of the invention is constructed to feed the detected output from the angular velocity sensor to a brake system. As a result, a brake control can be properly made according to the angular velocity information detected by the angular velocity sensor, which is small-sized and integrated into the IC.

Still moreover, an automobile of the invention is constructed to feed the detected output from the angular velocity sensor to an airbag system. As a result, a proper airbag control can be properly made according to the angular velocity information detected by the angular velocity sensor, which is small-sized and integrated into the IC.

DESCRIPTION OF REFERENCE NUMERALS AND SIGNS

1 DRIVE ELECTRODE
2 MONITOR ELECTRODE
3 DETECTING ELECTRODE
4 OSCILLATING ELEMENT
5 DRIVE CIRCUIT
6 DETECTING CIRCUIT
7 MONITOR CIRCUIT
8 RECTIFYING CIRCUIT
9 SMOOTHING CIRCUIT
10 OSCILLATING CONTROL CIRCUIT
11 FIRST SWITCH
12 FIRST CAPACITOR
13 SECOND SWITCH
14 FIRST REFERENCE VOLTAGE
15 CONTROL SIGNAL FEEDING MEANS
16 FIRST RESISTOR
17 SECOND CAPACITOR
18 OSCILLATING CIRCUIT
19 SIGNAL FEEDING MEANS FROM SENSOR OUTSIDE
20 FIRST P-CHANNEL TRANSISTOR
21 FIRST N-CHANNEL TRANSISTOR
22 SECOND P-CHANNEL TRANSISTOR
23 SECOND N-CHANNEL TRANSISTOR
24 INVERTER
25 COMPARATOR
26 SECOND REFERENCE VOLTAGE
27 BODY
28 TIRE
29 BRAKE SYSTEM
30 ANGULAR VELOCITY SENSOR
31 SEAT
32 AIRBAG SYSTEM

BEST MODE FOR CARRYING OUT THE INVENTION

Figure 1:
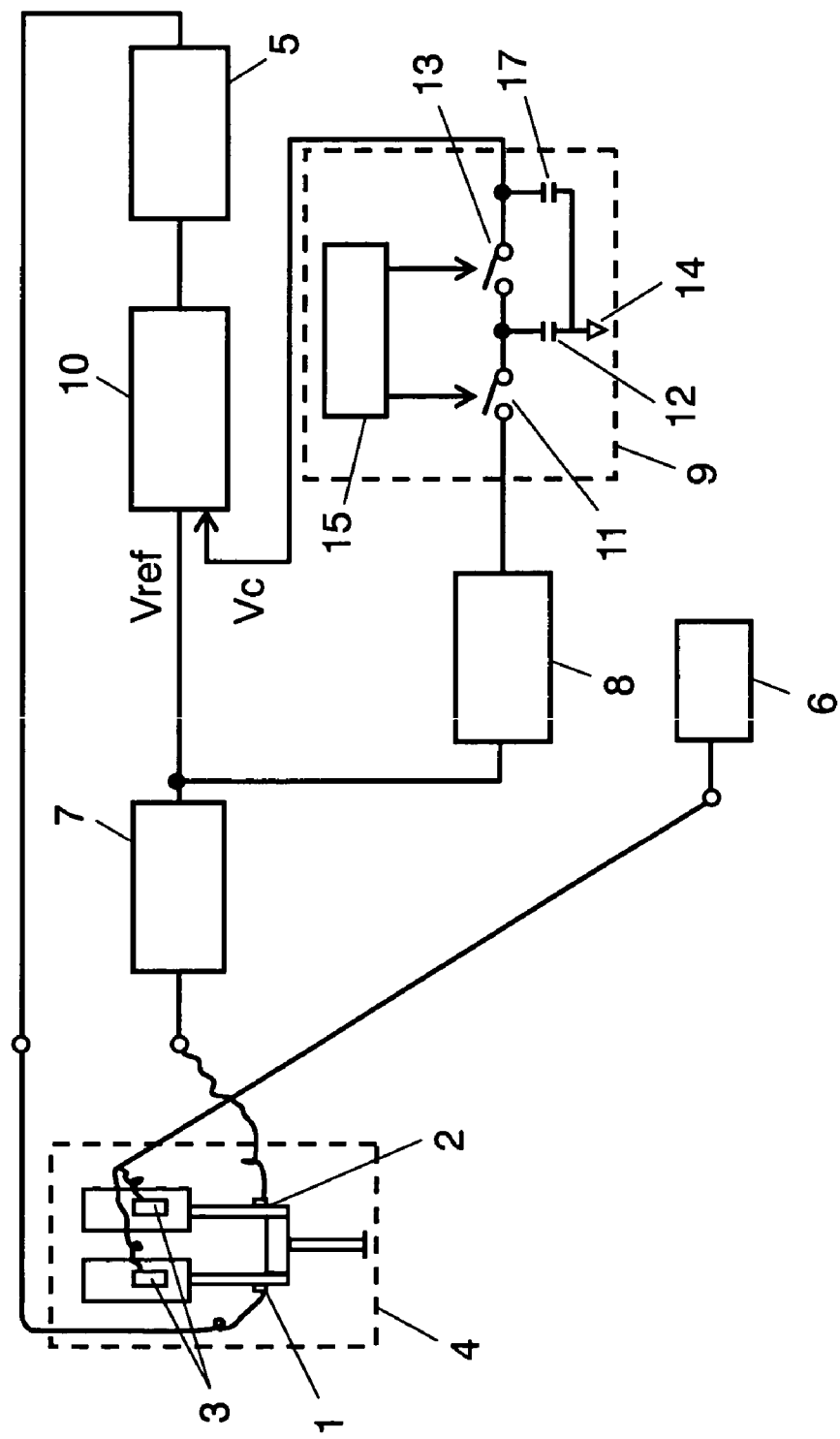
FIG. 1 is a circuit diagram of an embodiment of an angular velocity sensor of the invention.

Embodiments of the invention are described with reference to the accompanying drawings. In FIG. 1, oscillating element 4 is provided with drive electrode 1, monitor electrode 2 and detecting electrode 3. The output side of drive circuit 5, the input side of detecting circuit 6 and the input side of monitor circuit 7 are connected with drive electrode 1, detecting electrode 3 and monitor electrode 2, respectively. The output side of monitor circuit 7 is connected with the input side of rectifying circuit 8, which rectifies a signal inputted from monitor circuit 7 and outputs the rectified signal. The output side of rectifying circuit 8 is connected with the input side of smoothing circuit 9, which smoothes a signal inputted from rectifying circuit 8 and outputs the smoothed signal. The output side of monitor circuit 7 is also connected with the input side of oscillation control circuit 10, the output side of which is connected with the input side of drive circuit 5. The output signal of smoothing circuit 9 is inputted as gain control signal Vc to oscillation control circuit 10.

Smoothing circuit 9 is provided with first switch 11, first capacitor 12, second switch 13, first reference voltage 14 and second capacitor 17. One terminal of first switch 11 is connected with the output side of rectifying circuit 8, and one terminal of first capacitor 12 and one terminal of second switch 13 are connected with the other terminal of the same. First reference voltage 14 is connected with the other terminal of first capacitor 12, and one terminal of second capacitor 17 and the input side of oscillation control circuit 10 are connected with the other terminal of second switch 13. The other terminal of second capacitor 17 is commonly connected with the other terminal of second capacitor 12, and their common joint is connected with first reference voltage 14.

Control signal feeding means 15 feeds first switch 11 and second switch 13 with a control signal for controlling their ON/OFF. In other words, switch 11 and switch 13 are controlled by control signal feeding means 15.

Figure 2:
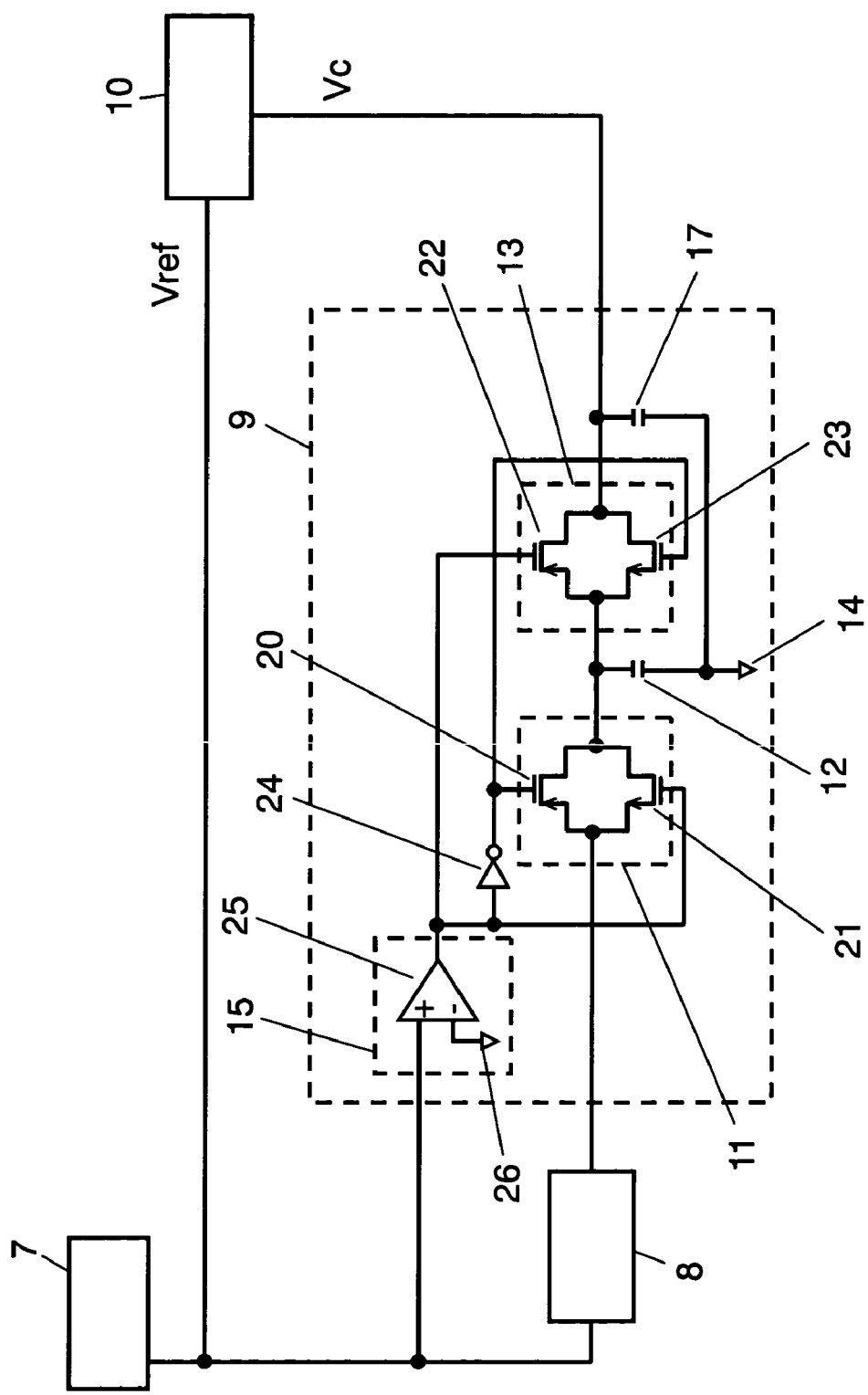
FIG. 2 is a circuit diagram showing examples of a smoothing circuit and a control signal feeding means, which are adopted in the angular velocity sensor of the invention.

FIG. 2 shows embodiments of smoothing circuit 9 and control signal feeding means 15 according to the invention. The same portions as those of FIG. 1 are designated by the common reference numerals. First switch 11 is configured of first P-channel transistor 20 and first N-channel transistor 21. The output side of rectifying circuit 8 is connected with the source of first P-channel transistor 20 and the source of first N-channel transistor 21. The drain of first P-channel transistor 20 and the drain of first N-channel transistor 21 are connected with one terminal of first capacitor 12. The other terminal of first capacitor 12 is connected with first reference potential 14.

Second switch 13 is configured of second P-channel transistor 22 and second N-channel transistor 23. One terminal of first capacitor 12 is connected with the source of second P-channel transistor 22 and the source of second N-channel transistor 23. The drain of second P-channel transistor 22 and the drain of second N-channel transistor 23 are connected with the input side of oscillation control circuit 10 and one terminal of second capacitor 17. The other terminal of second capacitor 17 is connected like first capacitor 14 with first reference potential 14.

Control signal feeding means 15 is provided with comparator 25 and second reference voltage 26. The output of monitor circuit 7 and second reference voltage 26 are connected with the positive input terminal and the negative input terminal of comparator 25, respectively.

The gate of first N-channel transistor 21 and the gate of second P-channel transistor 22 are connected with the output side of comparator 25 or the output terminal of control signal feeding means 15. The output of control signal feeding means 15 is inputted to inverter 24, and the gate of first P-channel transistor 20 and the gate of second N-channel transistor 23 are connected with the output of inverter 24.

Figure 3:
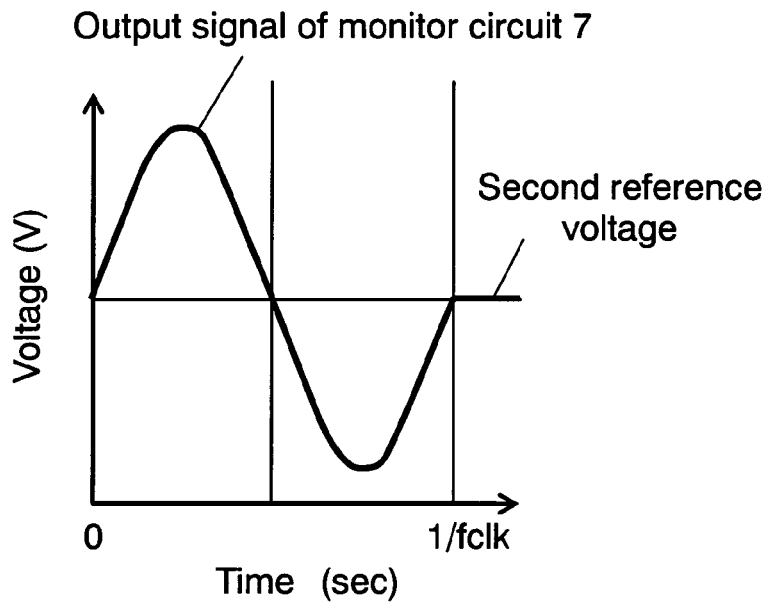
FIG. 3 is an output signal diagram of a monitor circuit, which is adopted in the angular velocity sensor of the invention.

FIG. 3 shows the output signal of monitor circuit 7. The ordinate indicates the magnitude of a voltage, and the abscissa indicates the period (or time), i.e., 1/fclk. FIG. 3 shows an alternating signal of frequency fclk referring to second reference voltage 26, which is fed to the negative input terminal of comparator 25.

Figure 4:
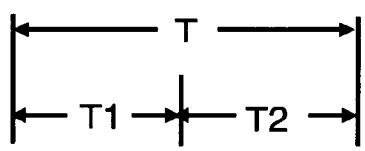
FIG. 4 is an output signal diagram of the control signal feeding means, which is adopted in the angular velocity sensor of the invention.
Figure 4:
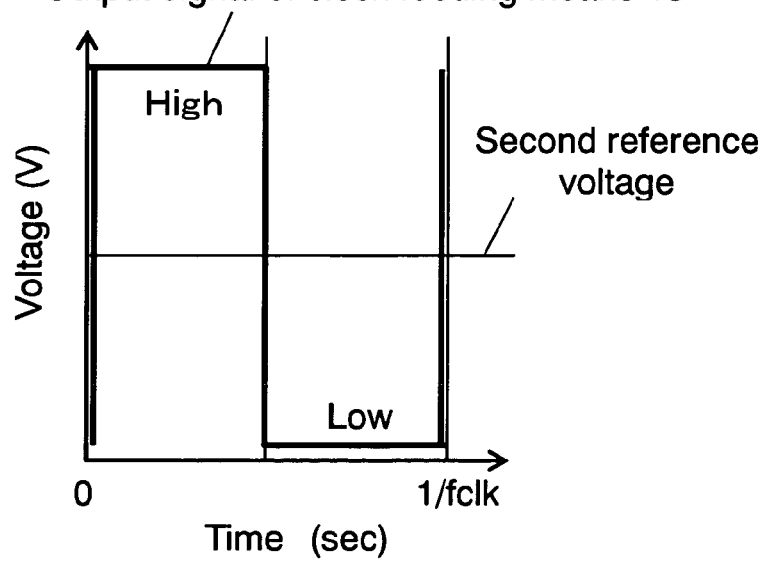

FIG. 4 shows the output signal of control signal feeding means 15. The scales of the ordinate and abscissa are identical to those of FIG. 3. FIG. 4 also shows the square signal of frequency fclk referring to second reference voltage 26.

The square signal shown in FIG. 4 is used as a switching control signal. In first half period T1, for which the output level of the signal is "high", first P-channel transistor 20 and first N-channel transistor 21 are turned ON, and second P-channel transistor 22 and second N-channel transistor 23 are turned OFF. If the output voltage of rectifying circuit 8 is designated by Vi and if capacity of first capacitor 12 is designated by C1, quantity of charge Q1 to be charged in first capacitor 12 is expressed by (Equation 3):

$$Q1 = C1 \cdot Vi \quad \text{(Equation 3)}.$$

In second half period T2, for which the output level of the switching control signal is "low", first P-channel transistor 20 and first N-channel transistor 21 are OFF, but second P-channel transistor 22 and second N-channel transistor 23 are ON. If the capacity value of first capacitor 12 is designated by C1 and if the voltage to be inputted to oscillation control circuit 10 is designated by V0, quantity of charge Q2 to be discharged from first capacitor 12 is expressed by (Equation 4):

$$Q2 = C1 \cdot V0 \quad \text{(Equation 4)}.$$

Therefore, quantity of charge Q to migrate from the output side of rectifying circuit 8 to the input side of oscillation control circuit 10 for one period T of the switching control signal is expressed by (Equation 5):

$$Q = Q1 - Q2 = C1 \cdot (Vi - V0) \quad \text{(Equation 5)}.$$

The quantity of charge transfer per second, i.e., the rate of electric current I is expressed by (Equation 6):

$$I = Q \cdot fclk = C1 \cdot (Vi - V0) fclk \quad \text{(Equation 6)}.$$

Figure 11:
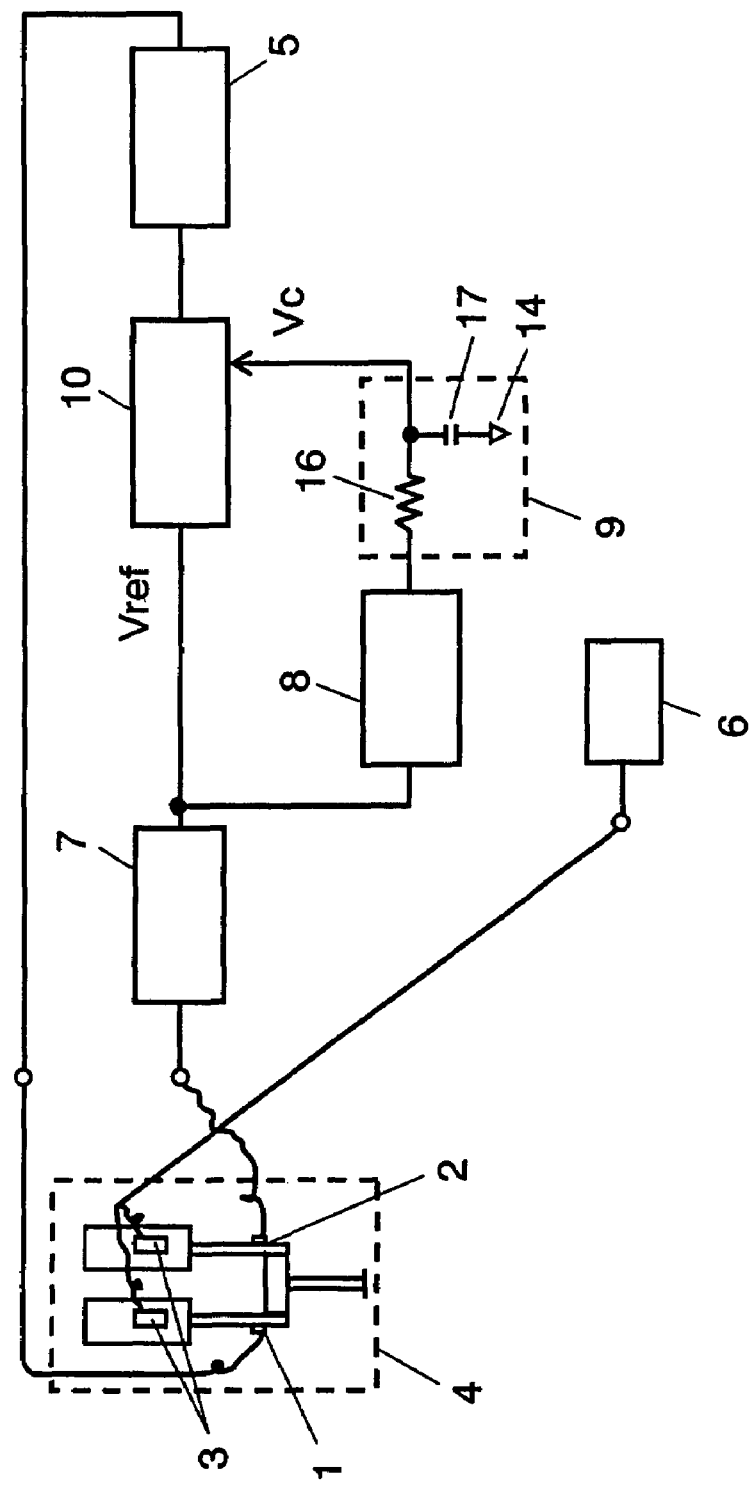
FIG. 11 is a circuit diagram for explaining one example of the angular velocity sensor of the prior art.

In FIG. 11, as has been described, resistance R1 of first resistor 16 connected between the output side of rectifying circuit 8 and the input side of oscillation control circuit 10 is expressed by (Equation 7):

$$R1 = (Vi - V0)/I \quad \text{(Equation 7)}.$$

Synthetic equivalent resistance R of first switch 11, first capacitor 12 and second switch 13 can be considered to be equal to resistance R1 of first resistor 16 shown in FIG. 11.

Referring to (Equation 6) and (Equation 7), therefore, equivalent resistance R is expressed by (Equation 8):

$$R = 1/(C1 \cdot fclk) \quad \text{(Equation 8)}.$$

Smoothing time constant τ2 at this time is expressed by (Equation 9):

$$\tau 2 = R \cdot C2 = C2/(C1 \cdot fclk) \quad \text{(Equation 9)}.$$

As apparent from (Equation 9), an equivalently large smoothing time contact can be set by reducing frequency fclk of the switching control signal of control signal feeding means 15, even if the capacities of first capacitor 12 and second capacitor 17 are small. Especially in case the capacitors are integrated into an IC, their area of occupation can be reduced to heighten effects for reducing the size of and integrating the sensor into the IC.

Figure 5:
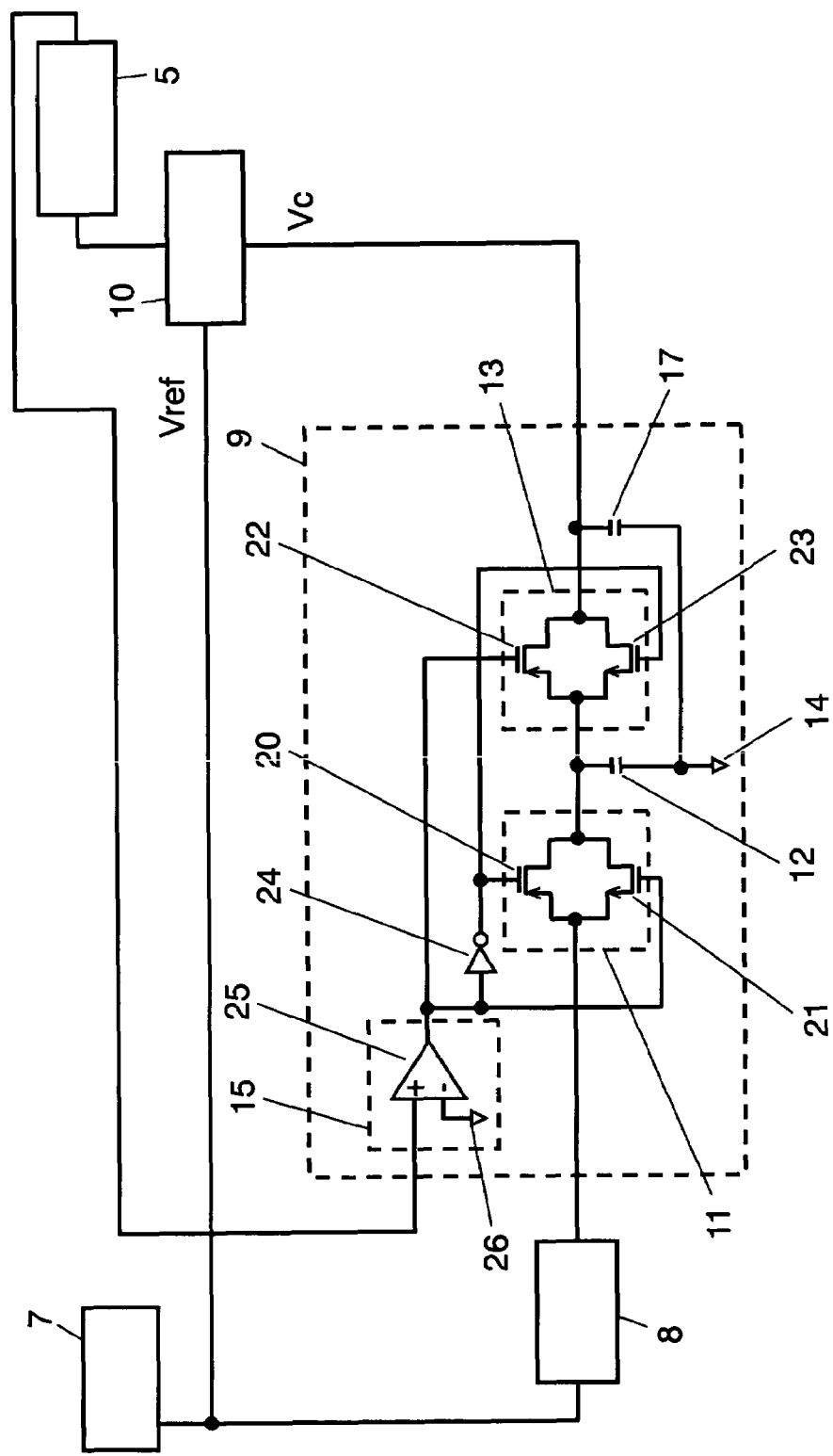
FIG. 5 is a circuit diagram of another angular velocity sensor of the invention.

The embodiment has been described on the example, in which the output signal of monitor circuit 7 is employed as the source signal of control signal feeding means 15. However, the embodiment should not necessarily be limited thereto. Similar effects can be achieved by employing the output signal of drive circuit 5 as the source signal of control signal feeding means 15, for example, as shown in FIG. 5.

Figure 6:
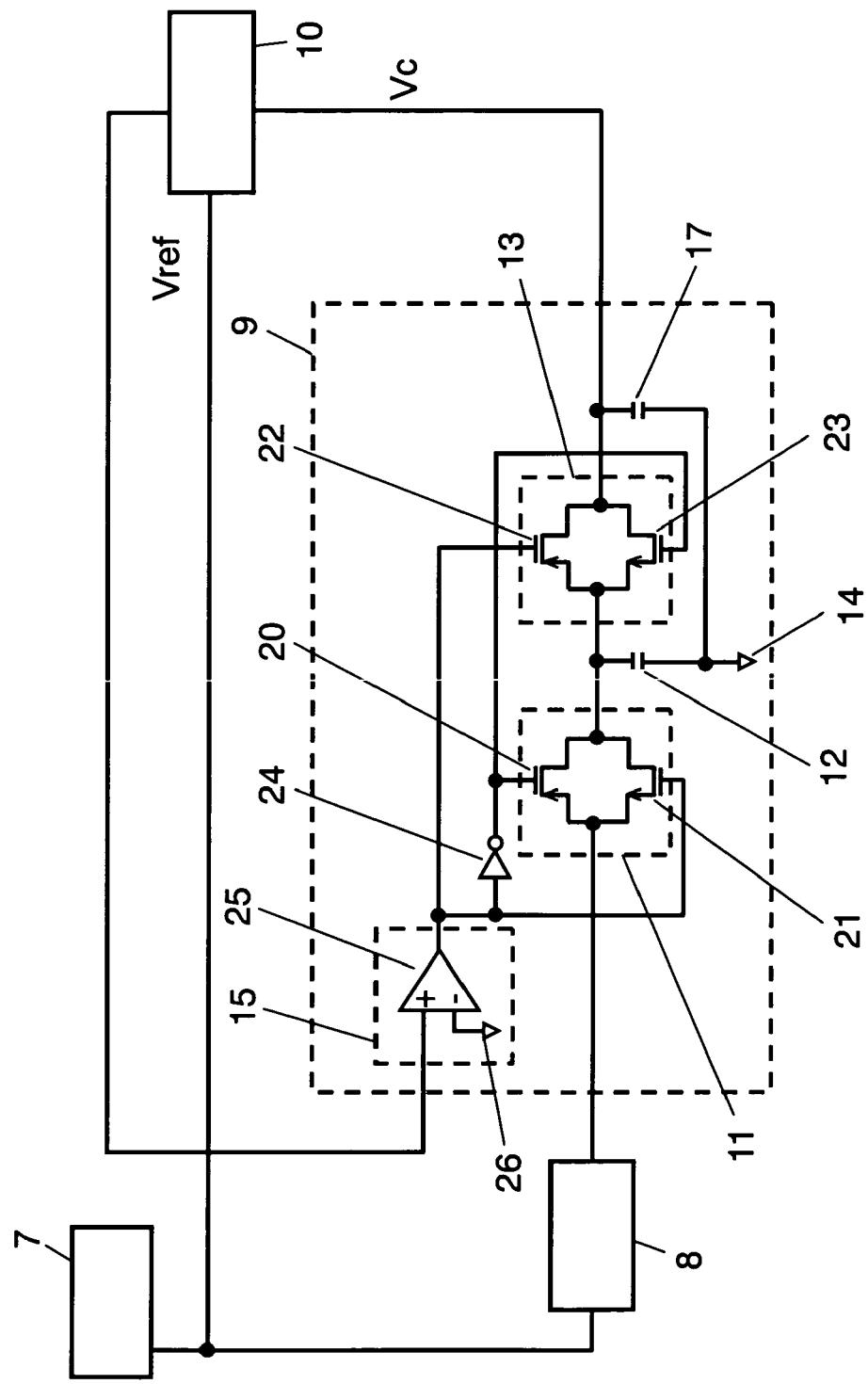
FIG. 6 is a circuit diagram of another angular velocity sensor.
Figure 7:
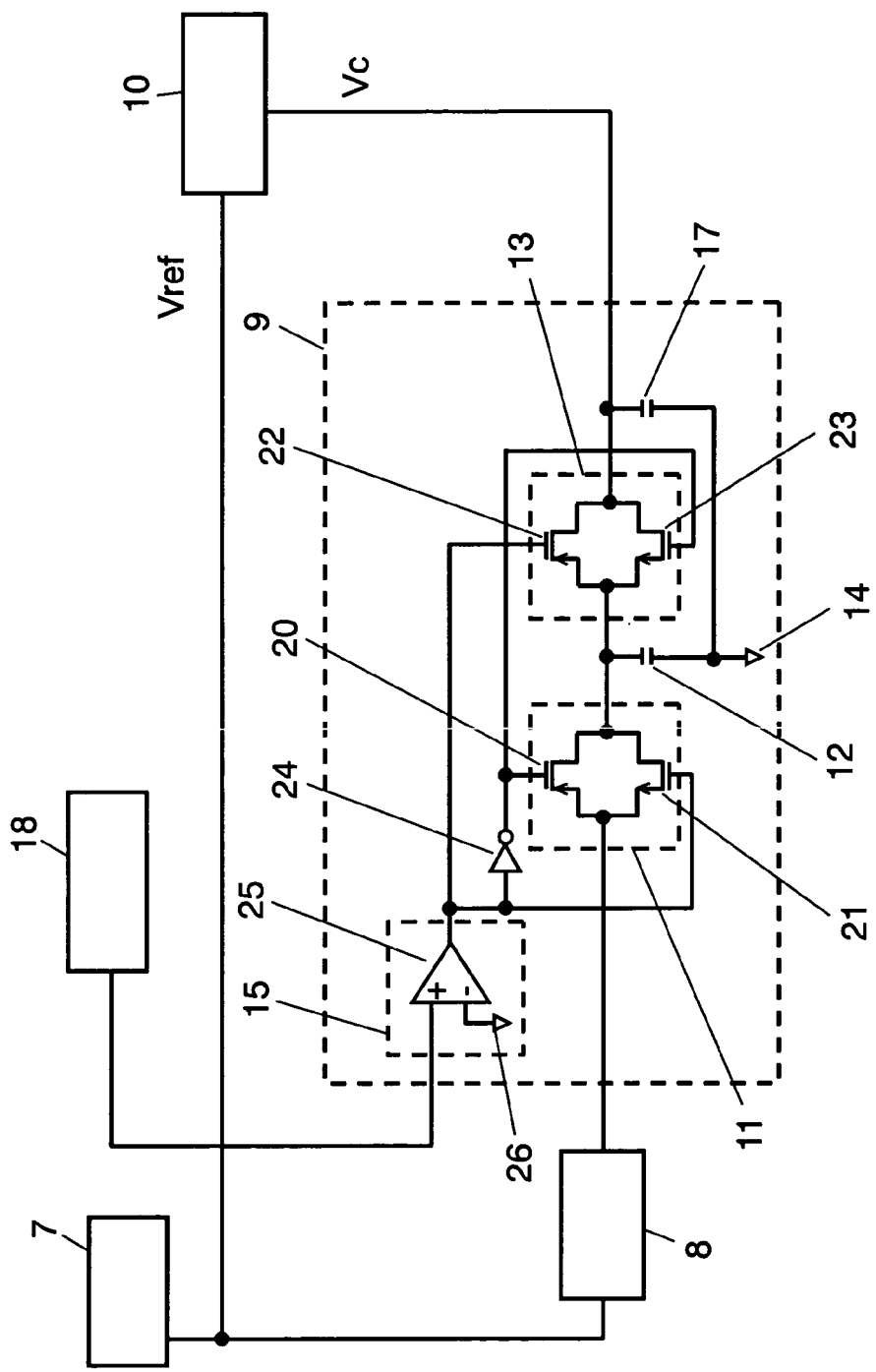
FIG. 7 is a circuit diagram of another angular velocity sensor.

Similar effects can also be achieved by employing the output signal of oscillation control circuit 10 as the source signal of control signal feeding means 15, for example, as shown in FIG. 6. Similar effects can also be achieved by employing the output signal of oscillation circuit 18 as the source signal of control signal feeding means 15, for example, as shown in FIG. 7.

Figure 8:
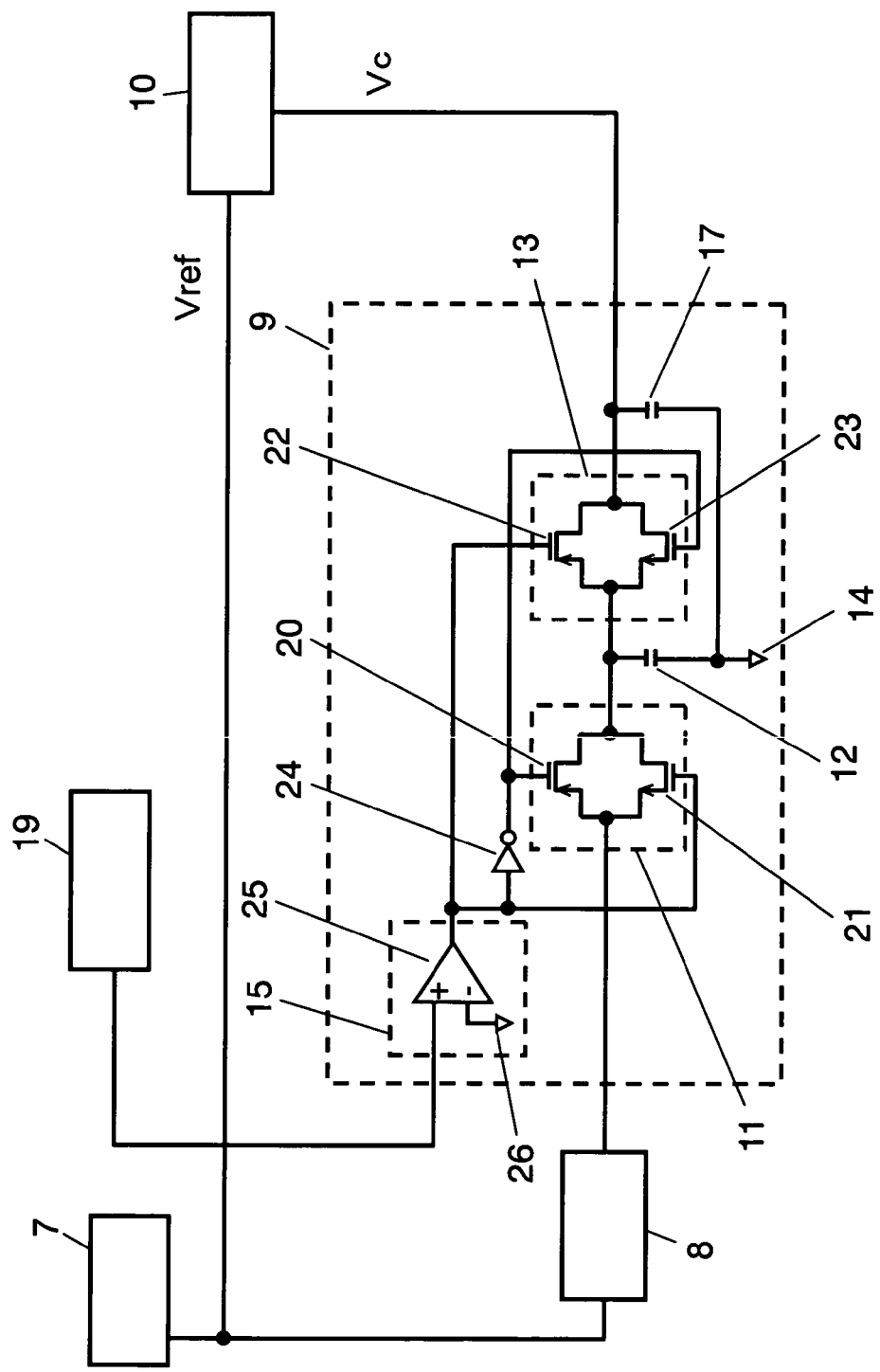
FIG. 8 is a circuit diagram of another angular velocity sensor.

Similar effects can also be achieved by employing an AC signal applied from signal feeding means 19 outside of the sensor, as the source signal of control signal feeding means 15, for example, as shown in FIG. 8.

First switch 11 and second switch 13 are configured of MIS type transistors but may also be configured of bipolar transistors. This configuration may also be made by combining those transistors. In the foregoing embodiments, inverter 24 is used for turning ON/OFF first switch 11 and second switch 13, but may also be replaced by means for inverting the polarities of the signal. Inverter 24 is not an essential component. Depending on the combination of the polarities of the transistors configuring first switch 11 and second switch 13, inverter 24 can also be dispensed with.

Figure 9:
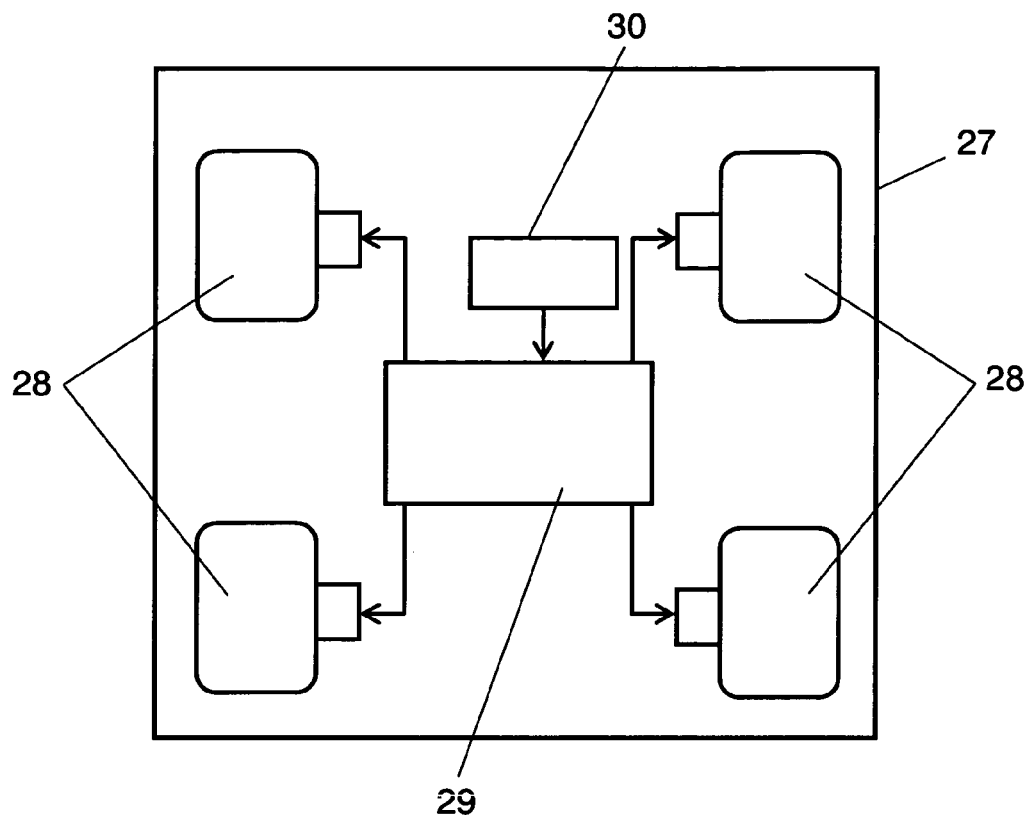
FIG. 9 is a schematic diagram of an automobile for explaining a brake system to be fed with a detected output from the angular velocity sensor according to the invention.

FIG. 9 is a schematic diagram of an automobile for explaining a brake system to be fed with a detected output from an angular velocity sensor according to the invention. Especially in the shown automobile, angular velocity sensor 30 feeds its detected output to brake system 29. The automobile is provided with body 27, a plurality of tires 28 supporting body 27, the brake system 29 provided for each tire 28, and angular velocity sensor 30 for feeding its detected output to brake system 29. In response to the angular velocity information detected by angular velocity sensor 30 small-sized by the circuit integration, the vehicle can make a proper brake control with brake system 29.

Figure 10:
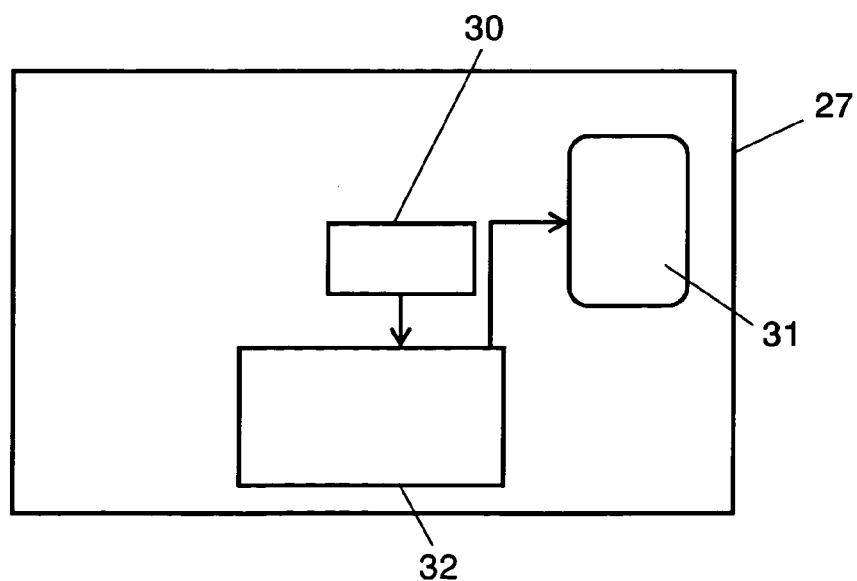
FIG. 10 is a schematic diagram of an automobile for explaining an airbag system to be fed with a detected output from the angular velocity sensor according to the invention.

FIG. 10 is a schematic diagram of an automobile for explaining an airbag system to be fed with a detected output from an angular velocity sensor according to the invention. Especially in the shown automobile, angular velocity sensor 30 feeds its detected output to airbag system 32. The automobile is provided with at least one seat 31 disposed in body 27, airbag system 32 disposed near seat 31, and angular velocity sensor 30 for feeding its detected output to airbag system 32. In response to the angular velocity information detected by angular velocity sensor 30 reduced in size by the IC, the vehicle can make a proper airbag control with airbag system 32.

INDUSTRIAL APPLICABILITY

The angular velocity sensor according to the invention and the automobile using the former is highly effective in the size reduction and the circuit integration of the angular velocity sensor. The angular velocity sensor is useful especially for an automotive control system needing the size reduction of the system.

The invention claimed is:

1. An angular velocity sensor comprising:
    an oscillating element including a drive electrode, a monitor electrode and a detecting electrode;
    a drive circuit having an output side connected with the drive electrode of the oscillating element;
    a detecting circuit having an input side connected with the detecting electrode of the oscillating element;
    a monitor circuit having an input side connected with the monitor electrode of the oscillating element;
    a rectifying circuit for rectifying an output signal of the monitor circuit;
    a smoothing circuit for smoothing an output signal of the rectifying circuit to obtain a smoothed signal; and
    an oscillation control circuit adapted to be fed with the output signal of the monitor circuit and to have a gain controlled with an output signal of the smoothing circuit, the oscillation control circuit inputting its output signal to the drive circuit, wherein the smoothing circuit includes:
    a first switch having an input terminal connected with the output side of the rectifying circuit;
    a first capacitor having a first terminal connected with an output terminal of the first switch;
    a second switch having an input terminal connected with the output terminal of the first switch and an output terminal connected with an input side of the oscillation control circuit;
    a first reference voltage connected with a second terminal of the first capacitor;
    a second capacitor having a first terminal connected with the output terminal of the second switch and a second terminal connected with the first reference voltage; and
    control signal feeding means for feeding a signal to control the ON/OFF of the first switch and the second switch.

2. The angular velocity sensor of claim 1, wherein the control signal feeding means receives, as a source signal, the output signal of the monitor circuit.

3. The angular velocity sensor of claim 1, wherein the control signal feeding means receives, as a source signal, the output signal of the drive circuit.

4. The angular velocity sensor of claim 1, wherein the control signal feeding means receives, as a source signal, the output signal of the oscillation control circuit.

5. The angular velocity sensor of claim 1, wherein the control signal feeding means receives, as a source signal, an output signal of an oscillating circuit.

6. The angular velocity sensor of claim 1, wherein the control signal feeding means receives, as a source signal, an AC signal applied from signal generating means outside of the sensor.

7. An automobile comprising: a body; a plurality of tires for supporting the body; and a brake system provided for each tire, wherein the brake system is fed with a detected output from an angular velocity sensor of any of claims 1 to 6.

8. An automobile comprising: the body; at least one seat disposed in the body; and an airbag system disposed near the seat, wherein the airbag system is fed with a detected output from an angular velocity sensor of any of claims 1 to 6.

* * * * *